United States Patent Office 3,231,764
Patented Jan. 25, 1966

3,231,764
TUNNEL DIODE VOLTAGE PICKOFF CIRCUIT
Dean S. Thornberg and Richard M. Jepperson, Salt Lake City, Utah, assignors to Montek Division of Model Engineering and Manufacturing Corporation, Salt Lake City, Utah, a corporation of Indiana
Filed Oct. 7, 1963, Ser. No. 314,261
5 Claims. (Cl. 307—88.5)

The present invention relates to using negative resistance devices such as tunnel diodes in a voltage pickoff circuit for providing an output signal when an input voltage value changes in a predetermined direction through a predetermined point of voltage value. More particularly, the invention has reference to an improved pulse producing circuit in which the pulse is generated in response to an input voltage value passing through a predetermined point in value and in a predetermined direction of change.

In certain testing and monitoring circuits, it is useful to be able to develop a sharp pulse at the instant that a rising, or falling, signal crosses a predetermined voltage. Particular need for circuits of this character is in monitoring and test sets that are used in analyzing or testing, or even monitoring, beacons and transponders such as are used in tactical air control and navigation equipment. In one particular example it is desired to provide a voltage pickoff circuit which generates a sharp negative pulse at the instant a positive going signal crosses a predetermined voltage value. Accordingly, the present invention is directed to tunnel diode circuits useful in accurately and efficiently providing such pickoffs in the generation of sharp pulses under the above conditions.

It is an object of the invention to provide a voltage pickoff circuit for generating a sharp pulse at the time that an input signal value changes in a predetermined direction through or crossing a predetermined point, so that the circuit may be useful in providing accurate information in monitoring and testing electronic equipment.

Perhaps the outstanding advantage of the new circuit resides in using negative resistance devices such as tunnel diodes in the voltage pickoff circuit so that a substantially sharp pulse is produced at the desired point of a rising, or falling, characteristic curve of an input pulse to the circuit, because the negative resistance characteristics are found to be more useful than other devices of the prior art in the production of substantially sharp pulses.

A complete understanding of the invention may be had from the following description of a particular embodiment of the invention. In the description reference is made to the accompanying drawings of which:

Figure 1:
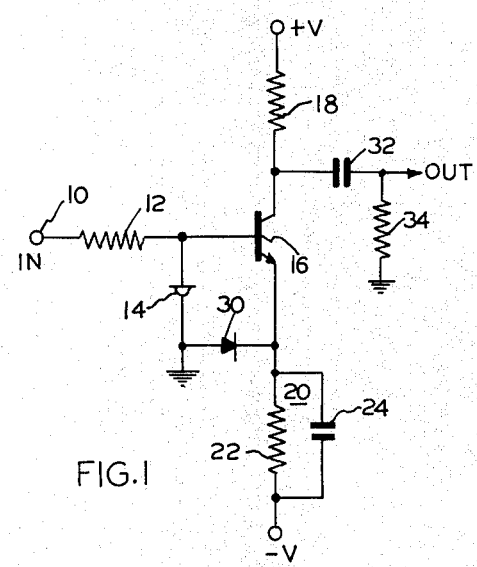
FIGURE 1 is a schematic circuit diagram of a tunnel diode voltage pickoff circuit for generating a sharp negative pulse at the instant a positive going signal crosses a predetermined voltage value in accordance with an embodiment of the present invention.
Figure 2:
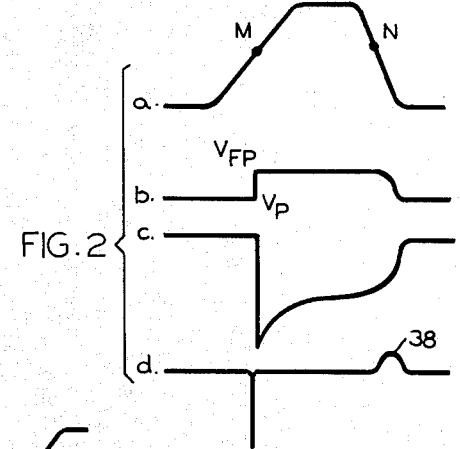
FIGURE 2 shows related waveforms to the circuit shown in FIG. 1.

With particular reference now to FIG. 1 of the drawings, a schematic embodiment of the features of the present invention is shown in which a voltage waveform of FIG. 2a is applied to the input terminal 10 of the circuit of FIG. 1. From the input terminal 10, current flows through the input resistor 12 and a negative resistance device such as a tunnel diode 14 to ground or a reference potential, as shown. The common terminal between the input resistance 12 and the tunnel diode 14 is connected to a base of a transistor 16, in which its collector is connected to a collector resistance 18, and in which the emitter is connected to an emitter-bias 20 comprising resistance 22 and a shunted capacitor 24. The distal ends of the resistance 18 and the emitter-bias 20 are connected to different terminals of a voltage source, as shown by legends on FIG. 1.

Figure 1A:
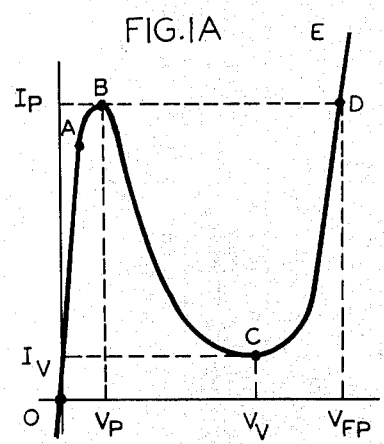
FIGURE 1a is a characteristic curve of a tunnel diode showing the negative resistance characteristic.

As the current increases along the curve of FIG. 2a toward the point M on the curve, the current-voltage characteristic of the tunnel diode passes along the curve shown in FIG. 1a starting at point zero and moving toward the peak current $I_p$. The current of the tunnel diode will pass through point A and rise to point B. Point B is the peak current $I_p$ of the characteristic curve for the tunnel diode. The voltage drop across the tunnel diode is $V_p$ and is quite small, usually in the order of, for example, 65 millivolts. The point B on FIG. 1a corresponds to point M of the input waveform of FIG. 2a. Point B of FIG. 1a is unstable and causes the tunnel diode to switch sharply to point D of the curve. This results in a voltage transition from $V_p$ to $V_{fp}$. $V_{fp}$ is usually in the order of, for example, 400 millivolts and is illustrated as a rise in voltage in the waveform of FIG. 2b.

The transistor 16 may be of the silicon type, and in the static state of the transistor it conducts a very low amount of current. Between the ground or reference point and the emitter of the transistor is a crystal rectifier 30. The base-to-emitter drop of the transistor is slightly greater than the drop across the rectifier 30, and as a result thereof the transistor is in a low current or cutoff state until the voltage across the tunnel diode exceeds the approximate value of 100 millivolts. The voltage drop across the tunnel diode 14 transfers or shifts from about 65 millivolts to 400 millivolts, as described as the voltage transition from $V_p$ to $V_{fp}$, described above, when point M of input current waveform is reached. This transition sharply increases the current in the base of the transistor and causes it to conduct resulting in a current flow through the collector-emitter circuit of the transistor. The voltage at the base of the transistor is shown in FIG. 2b. The increase of current in the transistor causes current to flow through resistance 18 and causes the voltage of the source to drop from +V on the collector of the transistor to a more negative value, as shown in FIG. 2c. The +V potential on the collector side of capacitor 32 being rapidly dropped by the action of the conduction of the transistor causes the capacitor 32 to discharge through the load resistor 34 and producing or generating thereby a substantially sharp negative output pulse, as shown in FIG. 2d. The capacitor 24 is used to shunt the resistance 22, as above described, to provide an increase in the gain of the circuit during the transistion period of generating the sharp negative output pulse during the rise time of the input signal.

When the input signal decreases from its peak value so that the current approaches point N of the curve of FIG. 2a, the voltage drop across the tunnel diode 14 decreases from an arbitrary point such as point E of FIG. 1a to the said point D thereof. During this transition, the base voltage waveform is not appreciably or significantly affected, but when the input signal waveform moves sufficiently downward along the waveform to reach point N, the tunnel diode voltage drop is at point D of the curve. The continued decrease in the input waveform voltage causes the tunnel diode to trace the current curve from point D to C, and as the input waveform voltage further decreases, the characteristic curve of FIG. 1a, is further traced until point B is approached. However, since current is not available to permit the curve to stabilize at point B, the tunnel diode switches substantially to point zero of the curve. The transition from point D to point zero is considerably slower than the transition during the rise time from point B to point D, and the resultant waveform on the collector of transistor 16 is much slower. The resultant charge of capacitor 32 through the load resistor results in a generally small output pulse that is of little consequence, and is shown as a small output pulse 38 on FIG. 2d.

Figure 3:
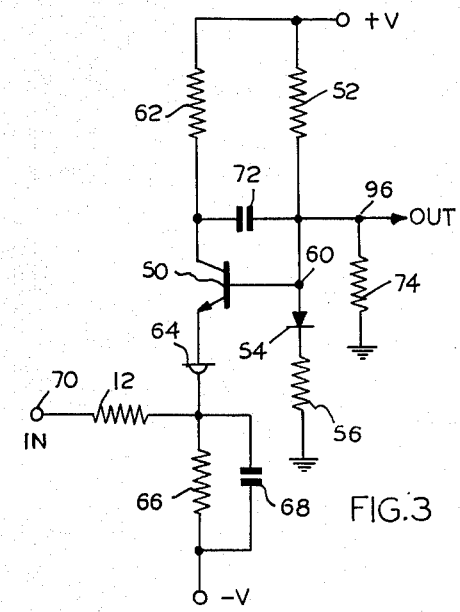
FIGURE 3 is a schematic circuit diagram of a tunnel diode voltage pickoff circuit for generating a sharp positive pulse at the instant a negative going signal crosses a predetermined voltage in accordance with an embodiment of the invention.

The tunnel diode voltage pickoff circuit of FIG. 3 uses the same characteristics of the tunnel diode as have been previously outlined and described for the detection of negative-going pulses in connection with the circuit of FIG. 1. In the circuit of FIG. 3, the tunnel diode voltage pickoff circuit produces or generates a sharp, positive pulse at the time a signal crosses a predetermined point passing from positive to negative and thus precisely senses the transition of the negative-going pulse through a given voltage point. The tunnel diode is used to detect this crossover point with extreme precision.

The transistor 50 of FIG. 3 is maintained at a generally fixed current level by the action of the voltage divider effect of the combined circuit effect of resistance 52, crystal rectifier 54 and resistance 56 which are in series relation between the terminal of the source and ground, as shown. An intermediate point 60 of the combined network is connected to the base of the transistor 50. This combination of elements maintains a forward bias on the base of the transistor 50 permitting current to flow from the source identified as +V through resistance 62, transistor 50, a tunnel diode 64, and a bias resistance network 66, which includes a capacitor 68, as shown in FIG. 3. This current is selected such that the tunnel diode 64 is at a point A of the characteristic curve shown in FIG. 1a.

Figure 4:
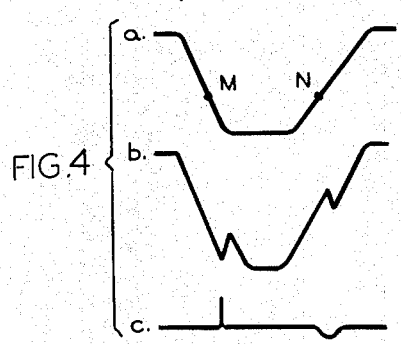
FIGURE 4 shows related waveforms useful in describing the operation of the circuit shown in FIG. 3.

When the waveform in FIG. 4a is presented to the input terminal 70 of the circuit shown in FIG. 3, a current will function as follows.

When the input waveform increases in negative value along the curve toward point M in FIG. 4a, the current flows from +V of the source through resistance 62, the transistor 50, the tunnel diode 64, and the input resistance 12. The change in current causes the collector of the transistor 50 to become more negative due to the current flow through the resistance 62. At the same time the tunnel diode characteristic, as shown in FIG. 1a, is moving from point A toward the unstable point B. When the current flow through resistance 12 is sufficient in value to permit the tunnel diode current to reach point B of the characteristic curve, the circuit becomes unstable and switches to point D of the curve. The sudden change in voltage drop across the tunnel diode 64 causes a sharp decrease in current in the transistor and the collector of the transistor rises very sharply to a positive value. The capacitor 72 commences to charge from the source through resistance 62 and the load resistor 74 by developing a sharp output pulse across the load resistor 74 in a positive direction as shown in FIG. 4c. The output of the circuit of FIG. 3 may be taken from terminal 96. As the input waveform continues in a negative direction, the waveform of the collector of transistor 50 will decrease accordingly as shown in FIG. 4b.

After the input waveform passes through its peak value, as shown in the trough of the waveform shown in FIG. 4a, the input waveform then progresses to a positive-going fall time and proceeds along the waveform of FIG. 4a toward point N. The tunnel diode is at some arbitrary point E of its characteristic curve shown in FIG. 1a, and as the current decreases the current passes along the curve through point D thereof. This takes place at point N of the input waveform and the tunnel diode 50 then traces the curve from point D of FIG. 1a through point C. At some arbitrary value between point D and point C, it will become unstable due to the fixed current through the circuit and the remaining current as a result of the input waveform applied to terminal 70. The tunnel diode will then return to its stable point A of the characteristic curve and causes a reduction of the voltage across the tunnel diode 64 which is less than $V_p$ shown on the characteristic curve, FIG. 1a, and the stable condition of point A further provides for an increase in the circuit current through the transistor 50. This results in a decrease in the voltage at the collector of the transistor 50, and the capacitor 72 commences to discharge through the load resistor to cause an output pulse that is a negative-going pulse across the load resistor 74, as shown in the small pulse following the positive pulse in the waveform of FIG. 4c. Due to the slow or relatively slow recovery characteristics of the tunnel diode, as has been described in connection with the tunnel diode operation of FIG. 1, and also due to the reduced voltage change compared to the transistion during the rise time, the negative-going output pulse is of much lower amplitude than the positive-going pulse generated during the fall time of the input waveform as the value crossed point M of FIG. 4a.

The points M and N of the input waveforms of FIGS. 2a and 4a, respectively, may be adjusted upwardly or downwardly along the waveform by adjusting the values of the biases applied to the circuit of FIG. 1 and FIG. 3, respectively. The circuits of the invention described above are extremely useful in providing the generation or production of pulses when a waveform changes in value through a given point. The pickoff voltage on the rise time of a pulse is substantially stable, regardless of temperature and other normal variations in semiconductor characteristics. The circuit is completely and substantially insensitive to frequencies of the input waveform, and is found to be very quick acting in producing the sharp pulse as shown in FIGS. 2d and 4c. These results are found to be significantly useful from pulse rates that are from substantially direct current to pulse repetition rates in excess of 20 megacycles per second. In all of these tests, the firing or pickoff point has remained substantially constant within 10 microvolts under all conditions.

It should be understood that the specific circuit apparatus herein schematically illustrated and described in detail is intended to be representative only of the features of the invention, as there are many changes which may be made therein without departing from the clear teachings of the invention. Accordingly, reference should be made to the following claims in determining the full scope of the invention.

What is claimed is:

1. A voltage pickoff circuit for generating a sharp pulse at the time a signal value crosses a predetermined point in a predetermined direction of polarity, comprising:

a transistor having a base, an emitter and a collector;
a resistance connected between the collector and a voltage source;
a capacitor-shunted resistance connected between the emitter and the other terminal of said voltage source;
a load impedance having one terminal connected to a reference point and the other terminal coupled through a charge capacitor to said collector;
an input impedance for coupling said signal having said predetermined point;
a negative resistance device and a rectifier each having a terminal thereof connected to different respective electrodes of said transistor;

whereby a sharp pulse is produced across the load impedance when said predetermined point of said signal is reached by a change thereof from a predetermined polarity.

2. A voltage pickoff circuit for producing a signal when a voltage value changes in a predetermined direction through a predetermined point comprising:
- a transistor having a base, an emitter, and a collector;
- a resistance connected from the collector to a source;
- an emitter-bias connected from the emitter to another point of said source;
- a load impedance connected from a reference point through a charge capacitor to said collector;
- an input impedance connected to said base for coupling said voltage having said predetermined point of voltage value to said base;
- a negative resistance device connected between said base and said reference point; and
- a rectifier connected between said reference point and said emitter;

whereby said signal is produced from said charge capacitor-load impedance network when the voltage applied to the input impedance changes in said predetermined direction through said predetermined point.

3. The circuit of claim 2 wherein the negative resistance device is a tunnel diode.

4. A voltage pickoff circuit for producing a signal when a voltage value changes in a predetermined direction through a predetermined point comprising:
- a transistor having a base, an emitter, and a collector;
- a resistance connected from the collector to a source;
- an emitter-bias connected from the emitter to another point of said source;
- a load impedance connected from a reference point through a charge capacitor to said collector;
- a negative resistance device connected between said emitter and said emitter-bias;
- a rectifier-resistance network having an intermediate point thereof connected to said base;
- an input impedance for coupling said voltage having said predetermined point of voltage value to the terminal between the negative resistance device and the emitter-bias;

whereby said signal is generated from said charge capacitor-load impedance network when the voltage applied to the input impedance changes in said predetermined direction through said predetermined point.

5. The circuit of claim 4 wherein the negative resistance device is a tunnel diode.

References Cited by the Examiner

UNITED STATES PATENTS 3,090,926  5/1963  Engel _____ 307—88.5

OTHER REFERENCES

Todd—Tunnel Diode Applications Hughes Semiconductor Division, May 1960.

ARTHUR GAUSS, *Primary Examiner.*